(12) United States Patent
Ichikawa

(10) Patent No.: US 9,868,354 B2
(45) Date of Patent: Jan. 16, 2018

(54) POWER FEEDING SYSTEM FOR VEHICLE, ELECTRICALLY POWERED VEHICLE AND POWER FEEDING APPARATUS FOR VEHICLE

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/324,830

(22) Filed: Jul. 7, 2014

(65) Prior Publication Data

US 2014/0324260 A1 Oct. 30, 2014

Related U.S. Application Data

(63) Continuation of application No. 12/992,958, filed as application No. PCT/JP2008/070276 on Nov. 7, 2008, now Pat. No. 8,798,829.

(51) Int. Cl.
*B60L 9/00* (2006.01)
*B60L 11/00* (2006.01)
(Continued)

(52) U.S. Cl.
CPC ............ *B60L 5/005* (2013.01); *B60L 11/182* (2013.01); *B60L 11/1803* (2013.01);
(Continued)

(58) Field of Classification Search
CPC ............... B60L 11/182; B60L 11/1833; B60L 11/1803; B60L 11/1829; B60L 11/1835;
(Continued)

(56) References Cited

U.S. PATENT DOCUMENTS 4,800,328 A 1/1989 Bolger et al.
5,461,298 A * 10/1995 Lara .................... B60L 3/0046
320/109
(Continued)

FOREIGN PATENT DOCUMENTS

AU 2006269374 C1 1/2007
AU 2007349874 A2 10/2008
(Continued)

OTHER PUBLICATIONS

Nov. 18, 2014 Office Action issued in U.S. Appl. No. 13/635,762.
(Continued)

*Primary Examiner* — Jaime Figueroa
(74) *Attorney, Agent, or Firm* — Oliff PLC

(57) ABSTRACT

An IPA-ECU (410) recognizes a position of a power transferring unit by image recognition based on image information from a camera (120) incorporated in a vehicle. Then, the IPA-ECU (410) performs guidance control such that the vehicle is guided to the power transferring unit based on a result of the image recognition (first guidance control). A resonant ECU (460) estimates a distance between the power transferring unit and a power receiving unit based on an electric power feeding condition from the power transferring unit to the power receiving unit. When the power transferring unit comes under a body of the vehicle, an HV-ECU (470) performs guidance control of the vehicle such that a position of the power receiving unit is adjusted to a position of the power transferring unit based on distance information from the resonant ECU (460) (second guidance control).

7 Claims, 8 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60L 5/00* (2006.01)
  *B60L 11/18* (2006.01)
  *G05D 1/02* (2006.01)
  *H02J 5/00* (2016.01)

(52) U.S. Cl.
  CPC ....... *B60L 11/1829* (2013.01); *B60L 11/1833* (2013.01); *B60L 11/1835* (2013.01); *G05D 1/0225* (2013.01); *H02J 5/005* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
  CPC ..... B60L 5/005; G05D 1/0225; Y02T 90/125; Y02T 90/121; Y02T 90/122; H02J 5/005
  USPC ............ 701/22; 320/109; 307/104; 333/195; 340/988–993; 191/10
  See application file for complete search history.

(56) References Cited

U.S. PATENT DOCUMENTS

| | | | |
|---|---|---|---|
| 5,573,090 A | 11/1996 | Ross | |
| 5,617,003 A | 4/1997 | Odachi et al. | |
| 5,654,621 A * | 8/1997 | Seelig | B60L 11/182 320/108 |
| 5,703,461 A | 12/1997 | Minoshima et al. | |
| 5,821,731 A * | 10/1998 | Kuki et al. | 320/108 |
| 5,850,135 A | 12/1998 | Kuki et al. | |
| 6,014,597 A * | 1/2000 | Kochanneck | 701/22 |
| 6,032,110 A * | 2/2000 | Ishihara | G01B 7/31 324/207.11 |
| 6,223,847 B1 | 5/2001 | Shimizu et al. | |
| 6,934,603 B1 * | 8/2005 | Kochanneck | 700/245 |
| 7,602,143 B2 * | 10/2009 | Capizzo | 320/109 |
| 7,741,734 B2 | 6/2010 | Joannopoulos et al. | |
| 7,880,337 B2 * | 2/2011 | Farkas | B60L 11/005 307/104 |
| 8,030,888 B2 | 10/2011 | Pandya et al. | |
| 8,033,349 B2 | 10/2011 | Ortmann et al. | |
| 8,169,340 B2 | 5/2012 | Oyobe et al. | |
| 8,178,995 B2 * | 5/2012 | Amano | B60L 11/182 307/104 |
| 8,319,376 B2 * | 11/2012 | Kitamura | H02J 7/025 307/104 |
| 8,378,524 B2 | 2/2013 | Mita | |
| 8,463,536 B2 | 6/2013 | Yamamoto | |
| 8,466,654 B2 | 6/2013 | Cook et al. | |
| 8,483,899 B2 | 7/2013 | Martin | |
| 8,519,569 B2 | 8/2013 | Shimokawa | |
| 8,729,735 B2 * | 5/2014 | Urano | H02J 5/005 307/104 |
| 9,114,719 B1 * | 8/2015 | Failing | B60L 3/00 |
| 9,160,176 B2 * | 10/2015 | Fukushima | H02J 5/005 |
| 9,385,558 B2 * | 7/2016 | Kawasaki | H02J 7/025 |
| 2002/0149673 A1 * | 10/2002 | Hirama et al. | 348/118 |
| 2003/0122687 A1 | 7/2003 | Trajkovic et al. | |
| 2004/0267420 A1 | 12/2004 | Tanaka et al. | |
| 2005/0264432 A1 * | 12/2005 | Tanaka et al. | 340/932.2 |
| 2006/0180362 A1 | 8/2006 | Yamaguchi et al. | |
| 2007/0042729 A1 | 2/2007 | Baaman et al. | |
| 2007/0131505 A1 | 6/2007 | Kim | |
| 2007/0222542 A1 | 9/2007 | Joannopoulos et al. | |
| 2008/0265684 A1 * | 10/2008 | Farkas | B60L 11/005 307/104 |
| 2008/0278264 A1 * | 11/2008 | Karalis | B60L 11/182 333/219 |
| 2009/0040068 A1 | 2/2009 | Oyobe et al. | |
| 2009/0045773 A1 | 2/2009 | Pandya et al. | |
| 2009/0096413 A1 | 4/2009 | Partovi et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267558 A1 * | 10/2009 | Jung | H02J 5/005 320/108 |
| 2009/0267709 A1 | 10/2009 | Joannopoulos et al. | |
| 2009/0267710 A1 | 10/2009 | Joannopoulos et al. | |
| 2009/0299918 A1 | 12/2009 | Cook et al. | |
| 2009/0313174 A1 | 12/2009 | Hafner et al. | |
| 2010/0045114 A1 | 2/2010 | Sample et al. | |
| 2010/0052431 A1 * | 3/2010 | Mita | B60L 11/182 307/104 |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0117596 A1 * | 5/2010 | Cook | B60L 11/182 320/108 |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0161217 A1 * | 6/2010 | Yamamoto | B60L 3/0046 701/408 |
| 2010/0171367 A1 * | 7/2010 | Kitamura | H02J 7/025 307/104 |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0187913 A1 | 7/2010 | Smith et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0225271 A1 * | 9/2010 | Oyobe | B60L 5/005 320/108 |
| 2010/0231053 A1 | 9/2010 | Karalis et al. | |
| 2010/0235006 A1 | 9/2010 | Brown | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0095618 A1 | 4/2011 | Schatz et al. | |
| 2011/0127846 A1 * | 6/2011 | Urano | H02J 5/005 307/104 |
| 2011/0241440 A1 | 10/2011 | Sakoda et al. | |
| 2011/0248674 A1 | 10/2011 | Baarman et al. | |
| 2011/0254503 A1 | 10/2011 | Widmer et al. | |
| 2011/0270462 A1 | 11/2011 | Amano et al. | |
| 2012/0001485 A1 | 1/2012 | Uchida | |
| 2012/0007549 A1 | 1/2012 | Murayama et al. | |
| 2012/0043172 A1 | 2/2012 | Ichikawa | |
| 2012/0091959 A1 | 4/2012 | Martin et al. | |
| 2012/0098348 A1 | 4/2012 | Inoue et al. | |
| 2012/0098483 A1 | 4/2012 | Patel | |
| 2012/0217819 A1 * | 8/2012 | Yamakawa | B60L 11/182 307/104 |
| 2013/0020862 A1 * | 1/2013 | Miller | H02J 5/005 307/9.1 |
| 2013/0037365 A1 | 2/2013 | Ichikawa | |
| 2013/0038715 A1 | 2/2013 | Ichikawa | |
| 2014/0035391 A1 | 2/2014 | Kitani | |

FOREIGN PATENT DOCUMENTS

| | | |
|---|---|---|
| AU | 2010200044 A1 | 1/2010 |
| CA | 2 615 123 A1 | 1/2007 |
| CA | 2 682 284 A1 | 10/2008 |

(56) References Cited

FOREIGN PATENT DOCUMENTS

| | | |
|---|---|---|
| CN | 101258658 A | 9/2008 |
| CN | 101277838 A | 10/2008 |
| CN | 101682216 A | 3/2010 |
| CN | 101860089 A | 10/2010 |
| DE | 102008046215 A1 | 9/2009 |
| EP | 0986034 A2 | 3/2000 |
| EP | 1 902 505 A2 | 3/2008 |
| EP | 1 930 203 A1 | 6/2008 |
| EP | 2 130 287 A1 | 9/2009 |
| FR | 2740921 A1 | 5/1997 |
| IN | 735/DELNP/2008 | 9/2008 |
| IN | 6195/DELNP/2009 | 2/2010 |
| JP | A-09-102329 | 4/1997 |
| JP | A 9-213378 | 8/1997 |
| JP | A-9-215211 | 8/1997 |
| JP | A-10-117407 | 5/1998 |
| JP | A-11-001177 | 1/1999 |
| JP | 2003-182489 A | 7/2003 |
| JP | A-2004-229425 | 8/2004 |
| JP | A 2004-291865 | 10/2004 |
| JP | A 2005-80324 | 3/2005 |
| JP | 2005-512893 A | 5/2005 |
| JP | A-2006-288034 | 10/2006 |
| JP | A-2007-097345 | 4/2007 |
| JP | A-2007-159359 | 6/2007 |
| JP | A 2008-174102 | 7/2008 |
| JP | 2009-501510 A | 1/2009 |
| JP | A-2009-106136 | 5/2009 |
| JP | 2010063245 A | 3/2010 |
| JP | A-2010-119246 | 5/2010 |
| JP | A-2010-141976 | 6/2010 |
| JP | A-2010-183813 | 8/2010 |
| JP | A-2010-206866 | 9/2010 |
| JP | A-2010-252446 | 11/2010 |
| JP | A-2011-182608 | 9/2011 |
| KR | 2008-0031398 A | 4/2008 |
| KR | 2010-0015954 | 2/2010 |
| RU | 2297928 C1 | 4/2007 |
| WO | WO 03/055734 A1 | 7/2003 |
| WO | WO 2007/008646 A2 | 1/2007 |
| WO | WO 2008/118178 A8 | 10/2008 |
| WO | WO 2009/054221 A1 | 4/2009 |
| WO | 2010052785 A1 | 5/2010 |
| WO | WO 2010/067763 A1 | 6/2010 |

OTHER PUBLICATIONS

Jan. 8, 2015 Notice of Allowance issued in U.S. Appl. No. 13/583,341.
Mar. 7, 2014 Office Action issued in U.S. Appl. No. 13/583,341.
U.S. Appl. No. 13/635,762, filed Sep. 18, 2012; Ichikawa.
May 4, 2012 Office Action issued in Russian Patent Application No. 2011122824/11(033848) (with translation).
A. Kurs et al., "Wireless Power Transfer via Strongly Coupled Magnetic Resonances," *Science*, Jul. 6, 2007, vol. 317, pp. 83-86.
International Search Report issued in Application No. PCT/JP2008/070276; dated Feb. 3, 2009 (with translation).
Written Opinion of the International Searching Authority issued in Application No. PCT/JP2008/070276; dated Feb. 3, 2009 (with translation).
Gomez-Bravo et al., "Parallel and diagonal parking in nonholonomic autonomous vehicles", Engineering Applications of Artificial Intelligence 14 (2001), pp. 419-434.
Office Action dated Jul. 24, 2014 issued in U.S. Appl. No. 13/635,762.
Aug. 27, 2014 Office Action issued in U.S. Appl. No. 13/583,341.
Sep. 10, 2014 Office Action issued in U.S. Appl. No. 13/504,806.
Mar. 6, 2015 Office Action issued in U.S. Appl. No. 13/635,762.
Mar. 26, 2015 Office Action issued in U.S. Appl. No. 13/504,806.
U.S. Appl. No. 14/734,500, filed Jun. 9, 2015.
Dec. 9, 2011 Office Action issued in Japanese Patent Application No. 2010-058793.
Dec. 9, 2011 International Search Report issued in PCT/IB2011/000502.
Jun. 12, 2013 Office Action issued in U.S. Appl. No. 12/992,958.
Jul. 9, 2012 Written Opinion issued in PCT/IB2011/000502.
Jan. 4, 2013 Office Action issued in U.S. Appl. No. 12/992,958.
May 12, 2016 Supplemental Notice of Allowability issued in U.S. Appl. No. 13/635,762.
Feb. 12, 2016 Office Action issued in U.S. Appl. No. 13/504,806.
Feb. 3, 2016 Supplemental Notice of Allowability issued in U.S. Appl. No. 13/635,762.
Nov. 30, 2015 Notice of Allowance issued in U.S. Appl. No. 13/635,762.
Oct. 6, 2016 Notice of Allowance issued in U.S. Appl. No. 13/504,806.

* cited by examiner

POWER FEEDING SYSTEM FOR VEHICLE, ELECTRICALLY POWERED VEHICLE AND POWER FEEDING APPARATUS FOR VEHICLE

This is a Continuation of U.S. application Ser. No. 12/992,958 filed Nov. 16, 2010, which is a National Stage of International Application No. PCT/JP2008/070276 filed Nov. 7, 2008. The prior applications, including the specifications, drawings and abstracts are incorporated herein by reference in their entirety.

TECHNICAL FIELD

The present invention relates to a power feeding system for vehicle, an electrically powered vehicle and a power feeding apparatus for vehicle, and more particularly to a technique for controlling parking of an electrically powered vehicle capable of receiving power from a power feeding apparatus provided outside of the vehicle in a non-contact manner to the power feeding apparatus.

BACKGROUND ART

Japanese Patent Laying-Open No. 9-215211 (Patent Document 1) discloses a charging system for electric vehicle capable of charging a power storage device of an electric vehicle from a power supply outside of the vehicle in a non-contact manner by electromagnetically coupling a primary coil connected to the power supply outside of the vehicle to a secondary coil connected to the power storage device of the vehicle. This charging system has the secondary coil provided on the underbody of the vehicle. A recess is formed in a floor of a parking space, with a coil moving apparatus movably supporting the primary coil provided therein. A body of the coil moving apparatus is provided with three magnetic sensors.

In order to charge the power storage device of the vehicle, the vehicle is parked over the recess to excite the secondary coil. Consequently, a position of the secondary coil is detected by the magnetic sensors. Then, the coil moving apparatus is driven based on the detection result, to guide the primary coil to a position where both coils are electromagnetically coupled to each other (see Patent Document 1).

Power transfer using electromagnetic induction, power transfer using a microwave, and power transfer by resonance are known as dominant non-contact power transfer techniques for transferring electric power in a non-contact manner without using a power cord or a power transfer cable.

Resonance is a technique for causing a pair of resonators (e.g., a pair of self-resonant coils) to resonate with each other in an electromagnetic field (near field) to transfer electric power in a non-contact manner through the electromagnetic field, and can transfer large electric power of several kW across a relatively long distance (e.g., several meters) (see Non-Patent Document 1).

Patent Document 1: Japanese Patent Laying-Open No. 9-215211
Patent Document 2: Japanese Patent Laying-Open No. 11-1177
Non-Patent Document 1: Andre Kurs et al., "Wireless Power Transfer via Strongly Coupled Magnetic Resonances," [online], Jul. 6, 2007, Science, Vol. 317, pp. 83-86, [searched on Sep. 12, 2007], the Internet <URL:http://www.sciencemag.org/cgi/reprint/317/5834/83.pdf

DISCLOSURE OF THE INVENTION

Problems to be Solved by the Invention

The charging system disclosed in Japanese Patent Laying-Open No. 9-215211 described above has large-sized equipment since the coil moving apparatus movably supporting the primary coil needs to be provided in the parking space. A simpler system structure is desired to spread the use of a vehicle capable of receiving electric power from a power feeding apparatus outside of the vehicle in the future.

Therefore, the present invention was made to solve such problems, and an object of the present invention is to provide a power feeding system for vehicle having a simple structure while ensuring parking accuracy to a power feeding apparatus, and an electrically powered vehicle and the power feeding apparatus for vehicle used in the system.

Means for Solving the Problems

According to the present invention, a power feeding system for vehicle for feeding electric power from a power transferring unit of a power feeding apparatus provided outside of a vehicle to a power receiving unit incorporated in the vehicle in a non-contact manner includes first and second sensing means, and first and second guidance control means. The first sensing means senses positional relation between the power transferring unit and the power receiving unit. The first guidance control means controls the vehicle such that the vehicle is guided to the power transferring unit based on a sensed result by the first sensing means. The second sensing means senses a distance between the power transferring unit and the power receiving unit based on an electric power feeding condition from the power transferring unit to the power receiving unit. The second guidance control means controls the vehicle such that a position of the power receiving unit is adjusted to a position of the power transferring unit based on a sensed result by the second sensing means when the vehicle comes within a prescribed distance from the power transferring unit by the first guidance control means.

Preferably, the power transferring unit is arranged on the ground. The power receiving unit is arranged on an underbody of the vehicle. An area where the power transferring unit and the power receiving unit face each other is smaller than an area of the underbody of the vehicle. The first sensing means includes an image taking device and an image recognition unit. The image taking device is incorporated in the vehicle for taking an image of an outside of the vehicle. The image recognition unit recognizes a position of the power transferring unit based on an image taken by the image taking device. The prescribed distance is a distance that does not allow the image taking device to take an image of the power transferring unit when the vehicle approaches the power transferring unit and the power transferring unit comes under a body of the vehicle.

Preferably, the prescribed distance is a predetermined distance that allows the power receiving unit to receive electric power from the power transferring unit.

Preferably, the power feeding system for vehicle further includes communication means. The communication means conducts communication between the vehicle and the power feeding apparatus. The first sensing means further includes a light emission unit indicating a position of the power transferring unit. The light emission unit emits light after communication between the vehicle and the power feeding apparatus is established by the communication means.

Still preferably, the light emission unit emits light in response to an instruction received from the vehicle via the communication means.

Preferably, the power feeding system for vehicle further includes communication means. The communication means conducts communication between the vehicle and the power feeding apparatus. The power feeding apparatus is activated in response to an instruction received from the vehicle via the communication means.

Preferably, the power transferring unit includes a power transferring coil for receiving electric power from a power supply. The power receiving unit includes a power receiving coil for receiving electric power from the power transferring coil in a non-contact manner. The second sensing means includes a distance estimation unit. The distance estimation unit estimates the distance between the power transferring unit and the power receiving unit based on information about electric power transferred from the power transferring coil to the power receiving coil.

Preferably, electric power supplied from the power transferring unit to the power receiving unit during adjustment of the position of the power receiving unit to the position of the power transferring unit by the second guidance control means is smaller than electric power supplied from the power transferring unit to the power receiving unit after completion of the adjustment.

Preferably, the first guidance control means includes a first control unit. The first control unit controls steering of the vehicle based on a sensed result by the first sensing means. The second guidance control means includes a second control unit. The second control unit controls driving and braking of the vehicle based on a sensed result by the second sensing means.

According to the present invention, an electrically powered vehicle capable of traveling with a motor by using electric power fed from a power transferring unit of a power feeding apparatus provided outside of the vehicle includes a power receiving unit, first and second sensing units, and first and second guidance control units. The power receiving unit is configured to receive electric power transferred from the power transferring unit in a non-contact manner. The first sensing unit senses a position of the power transferring unit. The first guidance control unit controls the vehicle such that the vehicle is guided to the power transferring unit based on a sensed result by the first sensing unit. The second sensing unit senses a distance between the power transferring unit and the power receiving unit based on a power feeding condition from the power transferring unit to the power receiving unit. The second guidance control unit controls the vehicle such that a position of the power receiving unit is adjusted to a position of the power transferring unit based on a sensed result by the second sensing unit when the vehicle comes within a prescribed distance from the power transferring unit by the first guidance control unit.

Preferably, the power transferring unit is arranged on the ground. The power receiving unit is arranged on an underbody of the vehicle. An area where the power transferring unit and the power receiving unit face each other is smaller than an area of the underbody of the vehicle. The first sensing unit includes an image taking device and an image recognition unit. The image taking device takes an image of an outside of the vehicle. The image recognition unit recognizes a position of the power transferring unit based on an image taken by the image taking device. The prescribed distance is a distance that does not allow the image taking device to take an image of the power transferring unit when the vehicle approaches the power transferring unit and the power transferring unit comes under a body of the vehicle.

Preferably, the prescribed distance is a predetermined distance that allows the power receiving unit to receive electric power from the power transferring unit.

Preferably, the electrically powered vehicle further includes a communication unit. The communication unit conducts communication with the power feeding apparatus. The power feeding apparatus includes a light emission unit indicating a position of the power transferring unit. The communication unit transmits an instruction for lighting of the light emission unit to the power feeding apparatus after communication with the power feeding apparatus is established.

Preferably, the electrically powered vehicle further includes a communication unit. The communication unit conducts communication with the power feeding apparatus. The communication unit transmits an instruction to activate the power feeding apparatus to the power feeding apparatus.

Preferably, the power transferring unit includes a power transferring coil for receiving electric power from a power supply. The power receiving unit includes a power receiving coil for receiving electric power from the power transferring coil in a non-contact manner. The second sensing unit includes a distance estimation unit. The distance estimation unit estimates the distance between the power transferring unit and the power receiving unit based on information about electric power transferred from the power transferring coil to the power receiving coil.

Preferably, electric power supplied from the power transferring unit to the power receiving unit during adjustment of the position of the power receiving unit to the position of the power transferring unit by the second guidance control unit is smaller than electric power supplied from the power transferring unit to the power receiving unit after completion of the adjustment of the position of the power receiving unit to the position of the power transferring unit.

Preferably, the first guidance control unit includes a first control unit. The first control unit controls steering of the vehicle based on a sensed result by the first sensing unit. The second guidance control unit includes a second control unit. The second control unit controls driving and braking of the vehicle based on a sensed result by the second sensing unit.

According to the present invention, a power feeding apparatus for vehicle for feeding electric power to a power receiving unit incorporated in a vehicle in a non-contact manner includes a power transferring unit, a communication unit, and a power control unit. The power transferring unit is configured to transfer electric power received from a power supply to the power receiving unit in a non-contact manner. The communication unit conducts communication with the vehicle. The power control unit controls electric power transferred from the power transferring unit to the power receiving unit. The vehicle is configured to perform adjustment of a position of the power receiving unit to a position of the power transferring unit based on an electric power feeding condition from the power transferring unit to the power receiving unit. During reception of a signal indicating that the adjustment is being performed in the vehicle from the vehicle via the communication unit, the power control unit controls the electric power to be smaller than electric power transferred from the power transferring unit to the power receiving unit after completion of the adjustment.

Preferably, the power feeding apparatus for vehicle further includes a light emission unit indicating a position of the power transferring unit. The light emission unit emits light after communication with the vehicle is established by the communication unit.

Still preferably, the light emission unit emits light in response to an instruction received from the vehicle via the communication unit.

Preferably, the power control unit is activated in response to an instruction received from the vehicle via the communication unit.

Effects of the Invention

In the present invention, parking control of the vehicle is performed in two stages. In the first stage, positional relation between the power transferring unit and the power receiving unit is sensed by the first sensing means, and the vehicle is controlled by the first guidance control means such that the vehicle is guided to the power transferring unit based on the sensed result. In the second stage, a distance between the power transferring unit and the power receiving unit is sensed by the second sensing means based on an electric power feeding condition from the power transferring unit to the power receiving unit. Then, when the vehicle comes within a prescribed distance from the power transferring unit by the first guidance control means, the vehicle is controlled by the second guidance control means such that a position of the power receiving unit is adjusted to a position of the power transferring unit based on the sensed result by the second sensing means. Accordingly, adjustment of the position of the power receiving unit incorporated in the vehicle to the position of the power transferring unit of the power feeding apparatus can be performed without providing large-sized equipment.

Therefore, according to the present invention, a power feeding system for vehicle having a simple structure can be realized while parking accuracy to a power feeding apparatus is ensured.

DESCRIPTION OF THE REFERENCE SIGNS

Figure 1:
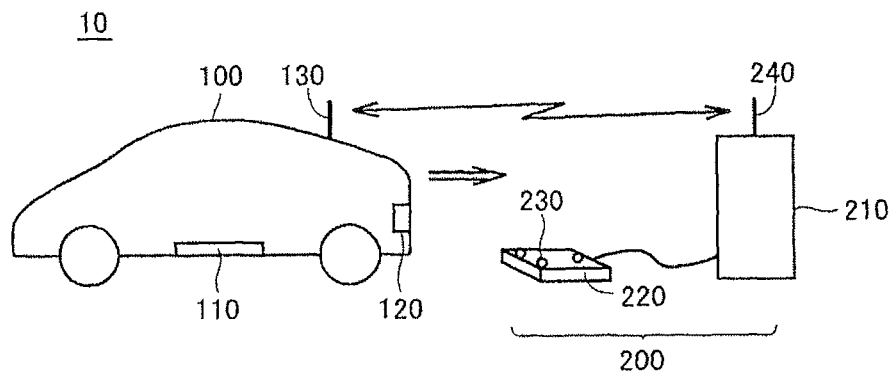
FIG. 1 is a general structure diagram of a power feeding system for vehicle according to an embodiment of the present invention.

10 power feeding system for vehicle; 100 electrically powered vehicle; 110 power receiving unit; 112, 340 secondary self-resonant coil; 114, 350 secondary coil; 120 camera; 130, 240 communication unit; 140 rectifier; 142 DC/DC converter; 150 power storage device; 162 boost converter; 164, 166 inverter; 172, 174 motor generator; 176 engine; 177 power split device; 178 drive wheel; 180 control device; 190, 272 voltage sensor; 200 power feeding apparatus; 210 power supply device; 220 power transferring unit; 222, 320 primary coil; 224, 330 primary self-resonant coil; 230 light emission unit; 250 AC power supply; 260 high-frequency power driver; 270 ECU; 274 current sensor; 310 high-frequency power supply; 360 load; 410 IPA-ECU; 420 EPS; 430 MG-ECU; 440 ECB; 450 EPB; 460 resonant ECU; 470 HV-ECU; SMR1, SMR2 system main relay; PL1, PL2 positive electrode line; NL negative electrode line.

BEST MODES FOR CARRYING OUT THE INVENTION

Embodiments of the present invention will be described hereinafter in detail with reference to the drawings. It is noted that the same or corresponding parts have the same reference characters allotted in the drawings, and description thereof will not be repeated.

FIG. 1 is a general structure diagram of a power feeding system for vehicle according to an embodiment of the present invention. Referring to FIG. 1, a power feeding system for vehicle 10 includes an electrically powered vehicle 100 and a power feeding apparatus 200. Electrically powered vehicle 100 includes a power receiving unit 110, a camera 120, and a communication unit 130.

Power receiving unit 110 is fixed to an underbody of the vehicle, and configured to receive electric power transferred from a power transferring unit 220 (to be described later) of power feeding apparatus 200 in a non-contact manner. Specifically, power receiving unit 110 includes a self-resonant coil (to be described later), and receives electric power from power transferring unit 220 in a non-contact manner by resonating with a self-resonant coil included in power transferring unit 220 through an electromagnetic field. Camera 120 is provided to sense positional relation between power receiving unit 110 and power transferring unit 220, and attached to the body of the vehicle such that it can take an image behind the vehicle. Communication unit 130 is a communication interface for conducting communication between electrically powered vehicle 100 and power feeding apparatus 200.

Power feeding apparatus 200 includes a power supply device 210, power transferring unit 220, light emission units 230, and a communication unit 240. Power supply device 210 converts commercial AC power supplied from a system power supply, for example, to high-frequency electric power, and outputs the same to power transferring unit 220. The high-frequency electric power generated by power supply device 210 has a frequency from 1 to ten-plus MHz, for example.

Power transferring unit 220 is fixed to a floor surface of a parking space, and configured to transfer the high-frequency electric power supplied from power supply device 210 to power receiving unit 110 of electrically powered vehicle 100 in a non-contact manner. Specifically, power transferring unit 220 includes a self-resonant coil (to be described later), and transfers electric power to power receiving unit 110 in a non-contact manner by resonating with the self-resonant coil included in power receiving unit 110 through an electromagnetic field. The plurality of light emission units 230 are provided on power transferring unit 220 to indicate a position of power transferring unit 220. Light emission units 230 each include an LED, for example. Communication unit 240 is a communication interface for conducting communication between power feeding apparatus 200 and electrically powered vehicle 100.

In power feeding system for vehicle 10, power transferring unit 220 of power feeding apparatus 200 transfers high-frequency electric power, and the self-resonant coil included in power receiving unit 110 of electrically powered vehicle 100 and the self-resonant coil included in power transferring unit 220 resonate with each other through an electromagnetic field, thereby feeding the electric power from power feeding apparatus 200 to electrically powered vehicle 100. For electric power feeding from power feeding apparatus 200 to electrically powered vehicle 100, electrically powered vehicle 100 needs to be guided to power feeding apparatus 200 to adjust a position of power receiving unit 110 of electrically powered vehicle 100 to a position of power transferring unit 220 of power feeding apparatus 200. In the present embodiment, parking control of electrically powered vehicle 100 to power feeding apparatus 200 is performed in two stages.

Namely, in a first stage, positional relation between power receiving unit 110 of electrically powered vehicle 100 and power transferring unit 220 of power feeding apparatus 200 is sensed based on an image taken by camera 120, and the vehicle is controlled such that it is guided to power transferring unit 220 based on the sensed result. More specifically, an image of the plurality of light emission units 230 provided on power transferring unit 220 is taken by camera 120, and positions and orientations of the plurality of light emission units 230 are recognized by image recognition. Then, positions and orientations of power transferring unit 220 and the vehicle are recognized based on the image recognition result, and the vehicle is guided to power transferring unit 220 based on the recognition result.

An area where power receiving unit 110 and power transferring unit 220 face each other is smaller than an area of the underbody of the vehicle. When power transferring unit 220 comes under the body of the vehicle and camera 120 can no longer take an image of power transferring unit 220, parking control is switched from the first stage to a second stage. In the second stage, electric power is fed from power transferring unit 220 to power receiving unit 110, and a distance between power transferring unit 220 and power receiving unit 110 is sensed based on an electric power feeding condition. Then, the vehicle is controlled such that the position of power receiving unit 110 is adjusted to the position of power transferring unit 220 based on information about the distance.

Electric power transferred from power transferring unit 220 in the second stage described above is set to be smaller than electric power supplied from power transferring unit 220 to power receiving unit 110 after completion of adjustment of the position of power receiving unit 110 to the position of power transferring unit 220. This is because electric power transfer from power transferring unit 220 in the second stage describe above is for sensing the distance between power transferring unit 220 and power receiving unit 110, and large electric power for substantial electric power feeding is unnecessary.

Next, a non-contact power feeding method used in power feeding system for vehicle 10 according to the present embodiment will be described. In power feeding system for vehicle 10 according to the present embodiment, electric power is fed from power feeding apparatus 200 to electrically powered vehicle 100 by resonance.

Figure 2:
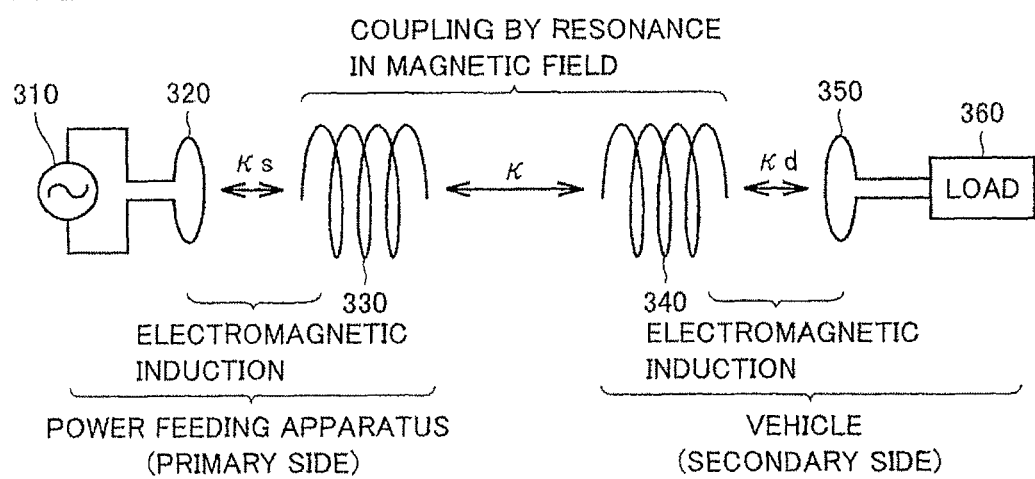
FIG. 2 illustrates the principles of power transfer by resonance.

FIG. 2 illustrates the principles of power transfer by resonance. Referring to FIG. 2, this resonance is such that, when two LC resonant coils having the same natural frequency resonate with each other in an electromagnetic field (near field) in the same way that two tuning forks resonate with each other, electric power is transferred from one of the coils to the other coil through the electromagnetic field.

Specifically, a high-frequency power supply 310 is connected to a primary coil 320, and high-frequency electric power from 1 to ten-plus MHz is fed to a primary self-resonant coil 330 magnetically coupled to primary coil 320 by electromagnetic induction. Primary self-resonant coil 330 is an LC resonator having an inductance of the coil itself and a stray capacitance, and resonates with a secondary self-resonant coil 340 having a resonant frequency the same as that of primary self-resonant coil 330 through an electromagnetic field (near field). Consequently, energy (electric power) is transferred from primary self-resonant coil 330 to secondary self-resonant coil 340 through the electromagnetic field. The energy (electric power) transferred to secondary self-resonant coil 340 is taken by a secondary coil 350 magnetically coupled to secondary self-resonant coil 340 by electromagnetic induction, and supplied to a load 360. Electric power transfer by resonance is implemented when a Q value indicating resonant strength of primary self-resonant coil 330 and secondary self-resonant coil 340 is greater than 100, for example.

In terms of correspondence relation with FIG. 1, secondary self-resonant coil 340 and secondary coil 350 correspond to power receiving unit 110 in FIG. 1, and primary coil 320 and primary self-resonant coil 330 correspond to power transferring unit 220 in FIG. 1.

Figure 3:
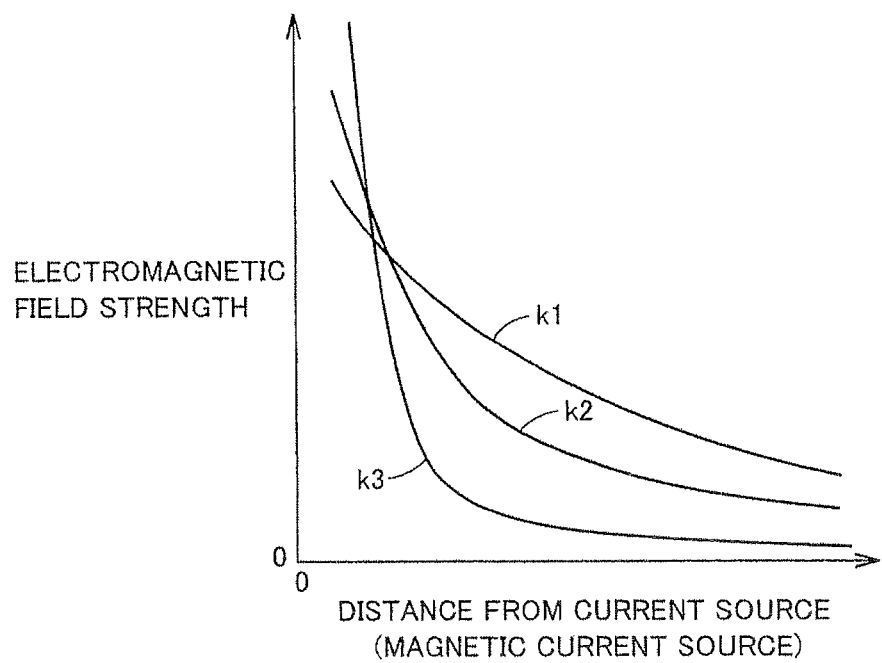
FIG. 3 shows relation between a distance from a current source (magnetic current source) and strength of an electromagnetic field.

FIG. 3 shows relation between a distance from a current source (magnetic current source) and strength of an electromagnetic field. Referring to FIG. 3, the electromagnetic field contains three components. A curve k1 denotes a component inversely proportional to a distance from a wave source, and is referred to as a "radiation electromagnetic field." A curve k2 denotes a component inversely proportional to the square of the distance from the wave source, and is referred to as an "induction electromagnetic field." A curve k3 denotes a component inversely proportional to the cube of the distance from the wave source, and is referred to as a "static electromagnetic field."

These electromagnetic fields include an area where electromagnetic wave strength decreases sharply with the distance from the wave source. Resonance uses this near field (evanescent field) to transfer energy (electric power). That is, by causing a pair of resonators (e.g., a pair of LC resonant coils) having the same natural frequency to resonate with each other with the use of a near field, energy (electric power) is transferred from one of the resonators (primary self-resonant coil) to the other resonator (secondary self-resonant coil). Since energy (electric power) is not propagated over a long distance in the near field, resonance can transfer electric power with less energy loss than an electromagnetic wave that transfers energy (electric power) in the "radiation electromagnetic field" in which energy is propagated over a long distance.

Figure 4:
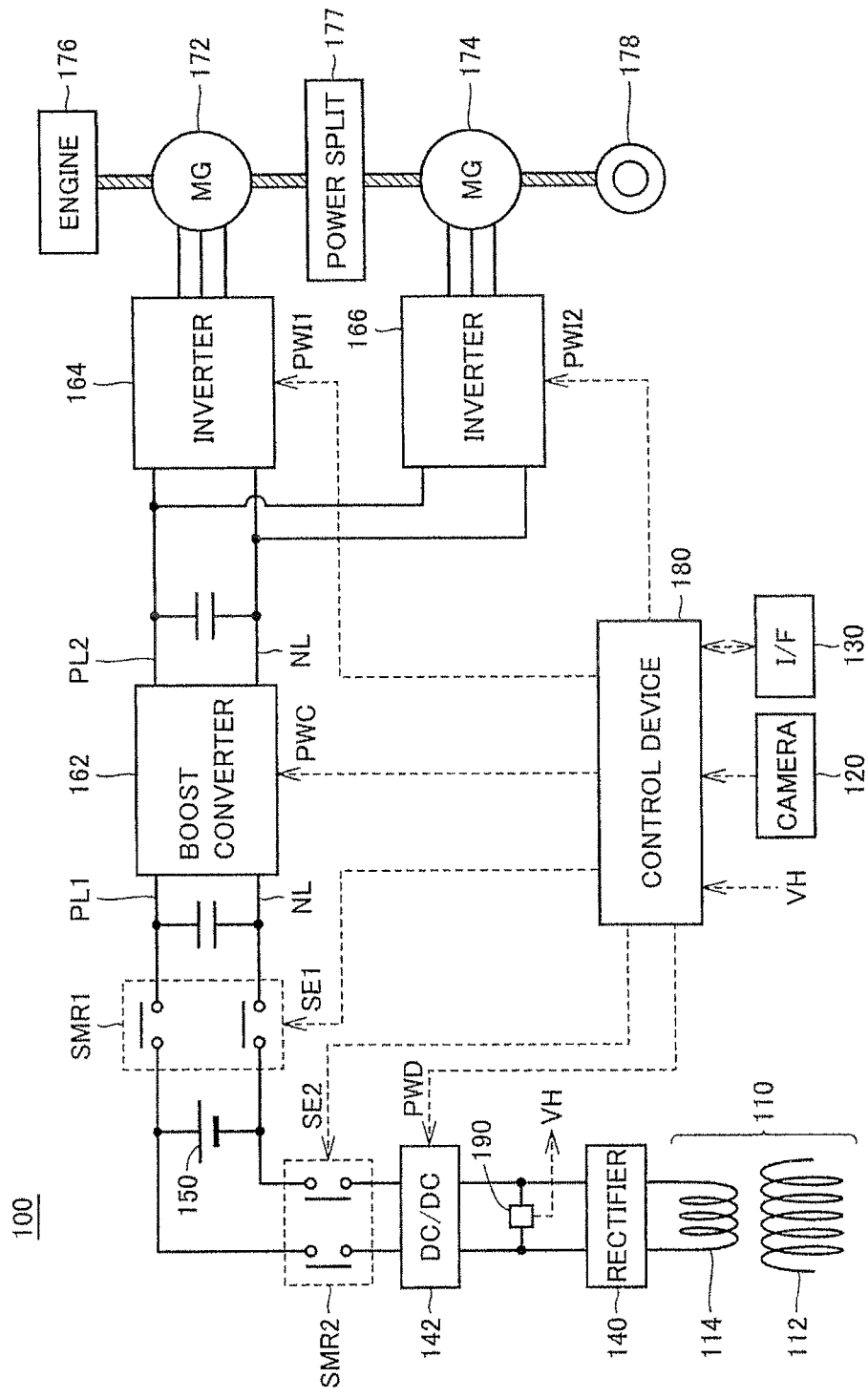
FIG. 4 is a detailed structure diagram of an electrically powered vehicle shown in FIG. 1.

FIG. 4 is a detailed structure diagram of electrically powered vehicle 100 shown in FIG. 1. Referring to FIG. 4, electrically powered vehicle 100 includes a power storage device 150, a system main relay SMR1, a boost converter 162, inverters 164, 166, motor generators 172, 174, an engine 176, a power split device 177, and a drive wheel 178. Electrically powered vehicle 100 also includes a secondary self-resonant coil 112, a secondary coil 114, a rectifier 140, a DC/DC converter 142, a system main relay SMR2, and a voltage sensor 190. Electrically powered vehicle 100 further includes a control device 180, camera 120, and communication unit 130.

Electrically powered vehicle 100 incorporates engine 176 and motor generator 174 as a driving source. Engine 176 and motor generators 172, 174 are linked to power split device 177. Electrically powered vehicle 100 travels with a driving force generated by at least one of engine 176 and motor generator 174. Mechanical power generated by engine 176 is split into two paths by power split device 177. Namely, one is a path for transmitting the power to drive wheel 178, and the other is a path for transmitting the power to motor generator 172.

Motor generator 172 is an AC rotating electric machine, and includes a three-phase AC synchronous motor having a rotor in which a permanent magnet is buried, for example. Motor generator 172 generates electric power by using kinetic energy of engine 176 which was split by power split device 177. When a state of charge (also referred to as "SOC") of power storage device 150 becomes lower than a predetermined value, for example, engine 176 is started and motor generator 172 generates electric power, to charge power storage device 150.

As with motor generator 172, motor generator 174 is an AC rotating electric machine, and includes a three-phase AC synchronous motor having a rotor in which a permanent magnet is buried, for example. Motor generator 174 generates a driving force by using at least one of electric power stored in power storage device 150 and electric power generated by motor generator 172. The driving force from motor generator 174 is transmitted to drive wheel 178.

During braking of the vehicle or during acceleration reduction on a descending slope, mechanical energy stored in the vehicle as kinetic energy and potential energy is used via drive wheel 178 to drive motor generator 174 for rotation, so that motor generator 174 operates as a power generator. As a result, motor generator 174 operates as a regenerative brake for converting travel energy to electric power to generate a braking force. The electric power generated by motor generator 174 is stored in power storage device 150.

Power split device 177 includes a planetary gear having a sun gear, a pinion gear, a carrier, and a ring gear. The pinion gear engages with the sun gear and the ring gear. The carrier rotatably supports the pinion gear, and is linked to a crankshaft of engine 176. The sun gear is linked to a rotation shaft of motor generator 172. The ring gear is linked to a rotation shaft of motor generator 174 and drive wheel 178.

Power storage device 150 is a rechargeable DC power supply, and includes a secondary battery such as a lithium-ion battery or a nickel-metal hydride battery. Power storage device 150 stores electric power supplied from DC/DC converter 142, and also stores regenerative electric power generated by motor generators 172, 174. Power storage device 150 supplies the stored electric power to boost converter 162. A capacitor having a large capacity, or any power buffer capable of temporarily storing electric power supplied from power feeding apparatus 200 (FIG. 1) and regenerative electric power from motor generators 172, 174 and supplying the stored electric power to boost converter 162 may be employed as power storage device 150.

System main relay SMR1 is provided between power storage device 150 and boost converter 162. System main relay SMR1 electrically connects power storage device 150 to boost converter 162 when a signal SE1 from control device 180 is activated, and cuts off an electrical path between power storage device 150 and boost converter 162 when signal SE1 is deactivated. Boost converter 162 boosts a voltage of a positive electrode line PL2 to be equal to or higher than a voltage output from power storage device 150 in response to a signal PWC from control device 180. Boost converter 162 includes a DC chopper circuit, for example. Inverters 164, 166 are provided correspondingly to motor generators 172, 174, respectively. Inverter 164 drives motor generator 172 in response to a signal PWI1 from control device 180, and inverter 166 drives motor generator 174 in response to a signal PWI2 from control device 180. Inverters 164, 166 each include a three-phase bridge circuit, for example.

Secondary self-resonant coil 112 is an LC resonant coil with open (unconnected) opposing ends, and receives electric power from power feeding apparatus 200 by resonating with a primary self-resonant coil (to be described later) of power feeding apparatus 200 through an electromagnetic field. A capacity component of secondary self-resonant coil 112 is a stray capacitance of the coil, however, a capacitor connected across both ends of the coil may be provided. Turns of secondary self-resonant coil 112 are set as appropriate to have a large Q value (e.g., Q>100) indicating resonant strength of the primary self-resonant coil and secondary self-resonant coil 112, large x indicating a degree of coupling thereof and the like, based on a distance from the primary self-resonant coil of power feeding apparatus 200, a resonant frequency of the primary self-resonant coil and secondary self-resonant coil 112, and the like.

Secondary coil 114 is provided coaxially with secondary self-resonant coil 112, and can be magnetically coupled to secondary self-resonant coil 112 by electromagnetic induction. Secondary coil 114 takes electric power received by secondary self-resonant coil 112 by electromagnetic induction, and outputs the same to rectifier 140. Secondary self-resonant coil 112 and secondary coil 114 form power receiving unit 110 shown in FIG. 1.

Rectifier 140 rectifies the AC power taken by secondary coil 114. DC/DC converter 142 converts the electric power rectified by rectifier 140 to electric power having a voltage level of power storage device 150 in response to a signal PWD from control device 180, and outputs the same to power storage device 150. System main relay SMR2 is provided between DC/DC converter 142 and power storage device 150. System main relay SMR2 electrically connects power storage device 150 to DC/DC converter 142 when a signal SE2 from control device 180 is activated, and cuts off an electrical path between power storage device 150 and DC/DC converter 142 when signal SE2 is deactivated. Voltage sensor 190 detects a voltage VH between rectifier 140 and DC/DC converter 142, and outputs the detected value to control device 180.

Control device 180 generates signals PWC, PWI1, PWI2 for driving boost converter 162 and motor generators 172, 174, respectively, based on an accelerator position, a vehicle speed, and other signals from various sensors, and outputs generated signals PWC, PWI1, PWI2 to boost converter 162 and inverters 164, 166, respectively. During travel of the vehicle, control device 180 activates signal SE1 to turn system main relay SMR1 on, and deactivates signal SE2 to turn system main relay SMR2 off.

During electric power feeding from power feeding apparatus 200 (FIG. 1) to electrically powered vehicle 100, control device 180 receives an image taken by camera 120 from camera 120. Further, control device 180 receives information about electric power (voltage and current) transferred from power feeding apparatus 200 from power feeding apparatus 200 via communication unit 130, and receives a detected value for voltage VH detected by voltage sensor 190 from voltage sensor 190. Then, control device 180 performs parking control of the vehicle based on the data such that the vehicle is guided to power transferring unit 220 of power feeding apparatus 200 (FIG. 1) with a method described later.

Upon completion of parking control to power transferring unit 220, control device 180 transmits an electric power feeding instruction to power feeding apparatus 200 via communication unit 130, and activates signal SE2 to turn system main relay SMR2 on. Then, control device 180 generates signal PWD for driving DC/DC converter 142, and outputs generated signal PWD to DC/DC converter 142.

Figure 5:
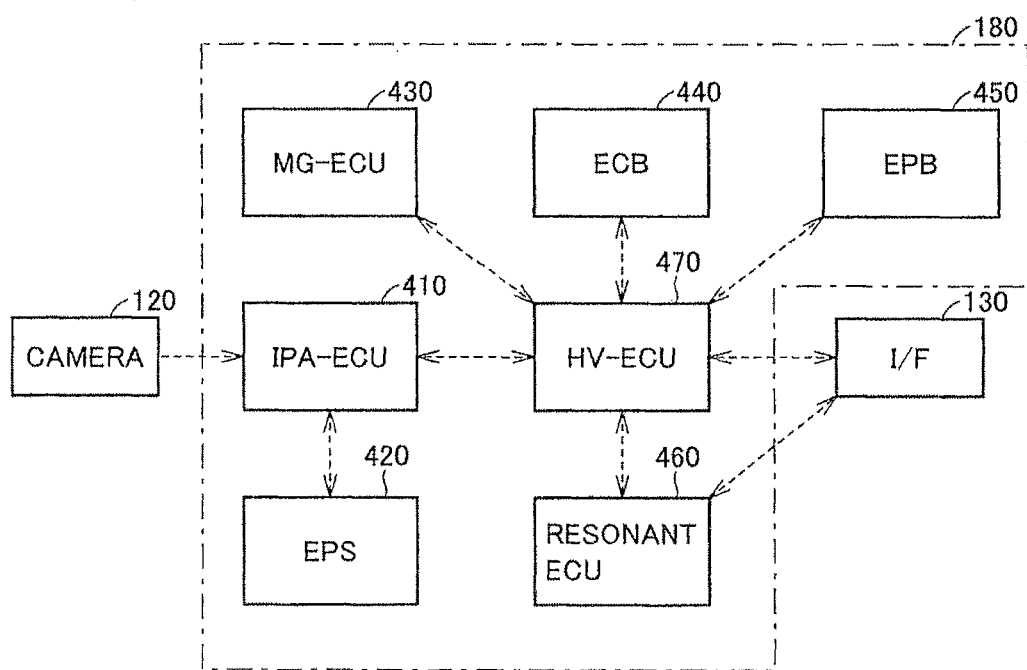
FIG. 5 is a functional block diagram of a control device shown in FIG. 4.

FIG. 5 is a functional block diagram of control device 180 shown in FIG. 4. Referring to FIG. 5, control device 180 includes an IPA (Intelligent Parking Assist)-ECU (Electronic Control Unit) 410, an EPS (Electric Power Steering) 420, an MG (Motor-Generator)-ECU 430, an ECB (Electronically Controlled Brake) 440, an EPB (Electric Parking Brake) 450, a resonant ECU 460, and an HV (Hybrid Vehicle)-ECU 470.

IPA-ECU 410 performs guidance control of guiding the vehicle to power transferring unit 220 of power feeding apparatus 200 (FIG. 1) based on image information received from camera 120 (first guidance control) when an operation mode of the vehicle is a charge mode. Specifically, IPA-ECU 410 recognizes power transferring unit 220 based on image information received from camera 120. The plurality of light emission units 230 indicating a position and an orientation of power transferring unit 220 are provided on power transferring unit 220, and IPA-ECU 410 recognizes positional relation with respect to power transferring unit 220 (general distance and orientation) based on an image of the plurality of light emission units 230 shown on camera 120. Then, IPA-ECU 410 outputs an instruction to EPS 420 based on the recognition result such that the vehicle is guided in appropriate orientation to power transferring unit 220.

When the vehicle approaches power transferring unit 220 and power transferring unit 220 comes under the body of the vehicle so that camera 120 can no longer take an image of power transferring unit 220, IPA-ECU 410 notifies HV-ECU 470 of completion of the guidance control based on the image information from camera 120 (first guidance control). During the first guidance control, EPS 420 automatically controls steering in response to an instruction from IPA-ECU 410.

MG-ECU 430 controls motor generators 172, 174 and boost converter 162 in response to an instruction from HV-ECU 470. Specifically, MG-ECU 430 generates signals for driving motor generators 172, 174 and boost converter 162, and outputs the same to inverters 164, 166 and boost converter 162, respectively.

ECB 440 controls braking of the vehicle in response to an instruction from HV-ECU 470. Specifically, ECB 440 controls a hydraulic brake and controls coordination between the hydraulic brake and the regenerative brake by motor generator 174 in response to an instruction from HV-ECU 470. EPB 450 controls an electric parking brake in response to an instruction from HV-ECU 470.

Resonant ECU 460 receives the information about electric power transferred from power feeding apparatus 200 (FIG. 1) from power feeding apparatus 200 via communication unit 130. Resonant ECU 460 also receives the detected value for voltage VH indicating a receiving voltage at the vehicle from voltage sensor 190 (FIG. 4). Then, resonant ECU 460 senses the distance between power transferring unit 220 of power feeding apparatus 200 and power receiving unit 110 of the vehicle by comparing a voltage of the electric power transferred from power feeding apparatus 200 with voltage VH.

Figure 6:
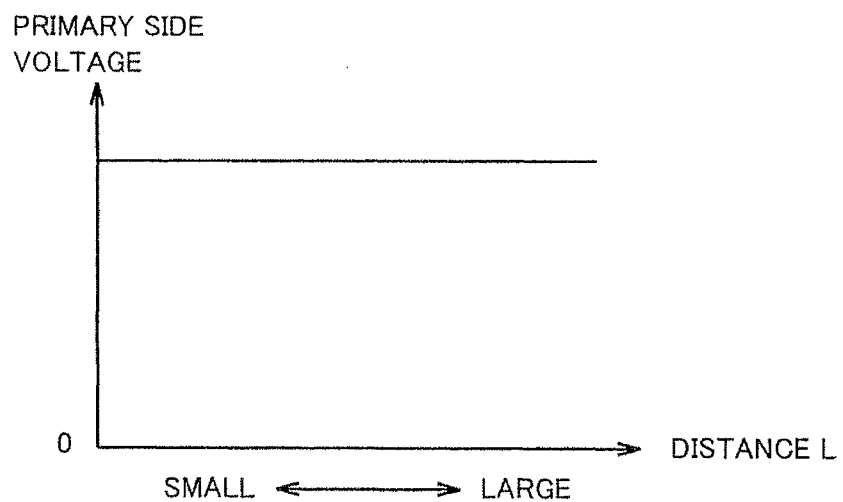
FIG. 6 shows relation between a distance between a power transferring unit and a power receiving unit, and a primary side voltage.
Figure 7:
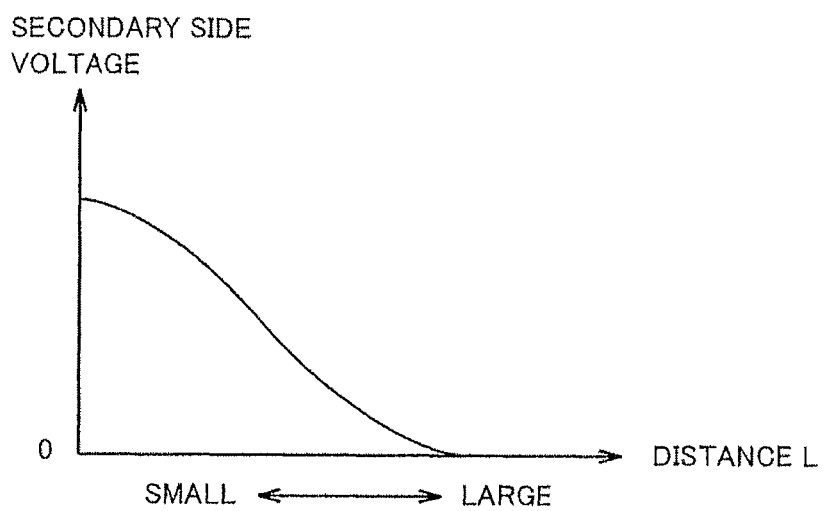
FIG. 7 shows relation between the distance between the power transferring unit and the power receiving unit, and a secondary side voltage.

Specifically, with respect to a constant primary side voltage (output voltage from power feeding apparatus 200) as shown in FIG. 6, a secondary side voltage (receiving voltage at electrically powered vehicle 100) varies with a distance L between power transferring unit 220 of power feeding apparatus 200 and power receiving unit 110 of electrically powered vehicle 100, as shown in FIG. 7. Accordingly, by determining relation between the primary side voltage and the secondary side voltage shown in FIGS. 6 and 7 in advance and creating a map or the like, the distance between power transferring unit 220 and power receiving unit 110 can be sensed based on the detected value for voltage VH indicating the secondary side voltage.

Figure 8:
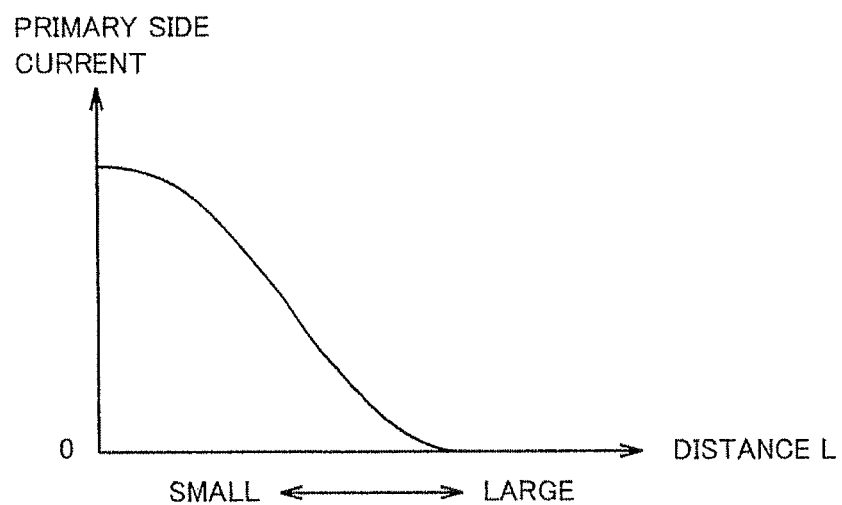
FIG. 8 shows relation between the distance between the power transferring unit and the power receiving unit, and a primary side current.

A primary side current (output current from power feeding apparatus 200) varies with distance L between power transferring unit 220 and power receiving unit 110, as shown in FIG. 8. Accordingly, the distance between power transferring unit 220 and power receiving unit 110 may be sensed based on a detected value for the output current from power feeding apparatus 200 by using this relation.

Referring back to FIG. 5, resonant ECU 460 senses the distance between power transferring unit 220 and power receiving unit 110, and outputs distance information to HV-ECU 470. In addition, resonant ECU 460 receives a charging start instruction from HV-ECU 470, and activates signal SE2 output to system main relay SMR2 to turn system main relay SMR2 on. Then, resonant ECU 460 generates the signal for driving DC/DC converter 142, and outputs the same to DC/DC converter 142.

When an operation mode of the vehicle is a travel mode, HV-ECU 470 outputs control instructions to MG-ECU 430 and ECB 440 in accordance with an operation condition of an accelerator pedal and a brake pedal, a travel condition of the vehicle and the like. When a driver gives an instruction to operate the parking brake by operating a parking brake switch or the like, HV-ECU 470 outputs an operation instruction to EPB 450.

When an operation mode of the vehicle is a charge mode, HV-ECU 470 establishes communication with power feeding apparatus 200 (FIG. 1) via communication unit 130, and outputs an activation instruction to activate power feeding apparatus 200 to power feeding apparatus 200 via communication unit 130. When power feeding apparatus 200 is activated, HV-ECU 470 outputs a lighting instruction for light emission units 230 provided on power transferring unit 220 of power feeding apparatus 200 to power feeding apparatus 200 via communication unit 130. When light emission units 230 are lighted, HV-ECU 470 outputs a during-guidance-control signal indicating that guidance control of guiding electrically powered vehicle 100 to power transferring unit 220 is being performed to power feeding apparatus 200 via communication unit 130, and outputs an instruction to perform the guidance control based on image information from camera 120 (first guidance control) to IPA-ECU 410.

Further, HV-ECU 470 receives notification of completion of the first guidance control from IPA-ECU 410, and performs the guidance control based on the distance information between power transferring unit 220 and power receiving unit 110 (second guidance control). Specifically, HV-ECU 470 receives the distance information between power transferring unit 220 of power feeding apparatus 200 and power receiving unit 110 of the vehicle from resonant ECU 460, and outputs instructions based on the distance information to MG-ECU 430 and ECB 440 for controlling driving and braking of the vehicle, respectively, such that the distance between power transferring unit 220 and power receiving unit 110 becomes a minimum distance.

Figure 9:
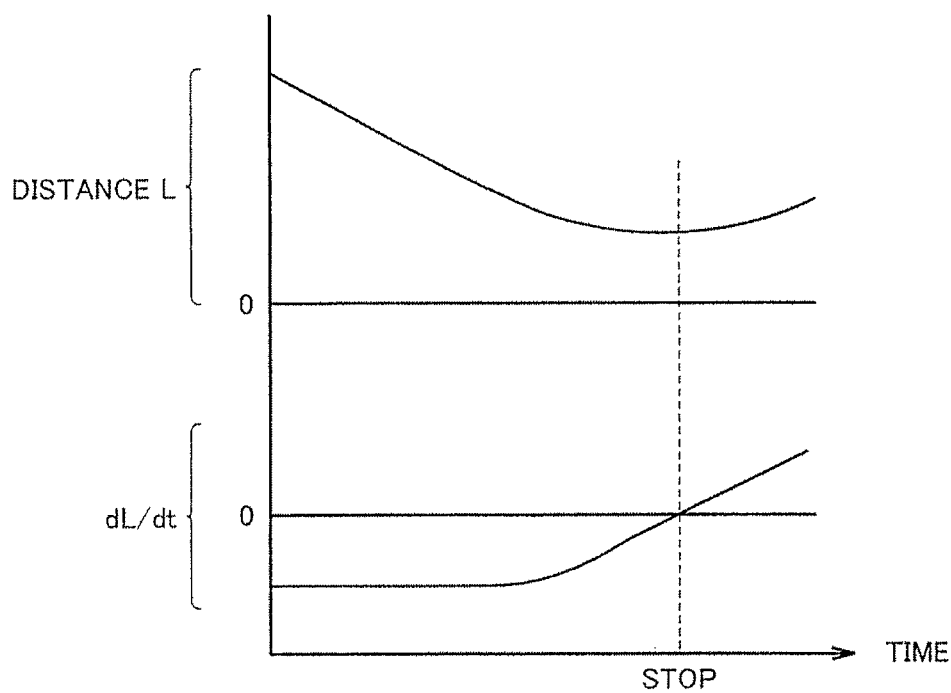
FIG. 9 shows variations in the distance between the power transferring unit and the power receiving unit and a differential value thereof.

Determination that the distance between power transferring unit 220 and power receiving unit 110 is a minimum distance is made when a differential value of distance L between power transferring unit 220 and power receiving unit 110 received from resonant ECU 460 becomes zero, for example, as shown in FIG. 9.

Referring back to FIG. 5, upon completion of alignment of power transferring unit 220 with power receiving unit 110, HV-ECU 470 outputs an operation instruction to EPB 450, and then outputs an electric power feeding instruction to feed electric power from power feeding apparatus 200 to power feeding apparatus 200 via communication unit 130, and outputs a charging start instruction to resonant ECU 460.

In control device 180, when an operation mode of the vehicle enters a charge mode, HV-ECU 470 establishes communication with power feeding apparatus 200 via communication unit 130, and transmits an activation instruction to power feeding apparatus 200 via communication unit 130. When power feeding apparatus 200 is activated in response to the activation instruction, HV-ECU 470 transmits a lighting instruction for light emission units 230 to power feeding apparatus 200 via communication unit 130. When light emission units 230 on power transferring unit 220 are lighted, HV-ECU 470 transmits a during-guidance-control signal to power feeding apparatus 200 via communication unit 130, and outputs an instruction to perform the guidance control based on image information from camera 120 (first guidance control) to IPA-ECU 410.

IPA-ECU 410 receives the instruction from HV-ECU 470, performs the guidance control based on image information from camera 120 (first guidance control), and outputs an instruction to automatically control steering to EPS 420. When the vehicle approaches power transferring unit 220 and power transferring unit 220 comes under the body of the vehicle so that camera 120 can no longer recognize power transferring unit 220, IPA-ECU 410 notifies HV-ECU 470 of completion of the first guidance control.

Resonant ECU 460 receives information about electric power transferred from power feeding apparatus 200 in response to the during-guidance-control signal (the electric power being smaller than electric power supplied after completion of the parking control, as described above) from power feeding apparatus 200 via communication unit 130, and receives a detected value for voltage VH indicating a receiving voltage at electrically powered vehicle 100 from voltage sensor 190. Then, resonant ECU 460 estimates a distance between power transferring unit 220 and power receiving unit 110 based on an electric power feeding condition from power feeding apparatus 200 to electrically powered vehicle 100, and outputs distance information to HV-ECU 470. HV-ECU 470 receives the notification of completion of the first guidance control based on the image information from camera 120 from IPA-ECU 410, and performs the guidance control based on the distance information between power transferring unit 220 and power receiving unit 110 received from resonant ECU 460 (second guidance control), and outputs instructions to automatically control driving and braking of the vehicle to MG-ECU 430 and ECB 440, respectively.

Then, upon completion of alignment of power transferring unit 220 with power receiving unit 110 by the second guidance control, HV-ECU 470 outputs an operation instruction to EPB 450, and then outputs an electric power feeding instruction to power feeding apparatus 200 via communication unit 130, and outputs a charging start instruction to resonant ECU 460. Consequently, substantial electric power feeding from power feeding apparatus 200 to electrically powered vehicle 100 is started.

Figure 10:
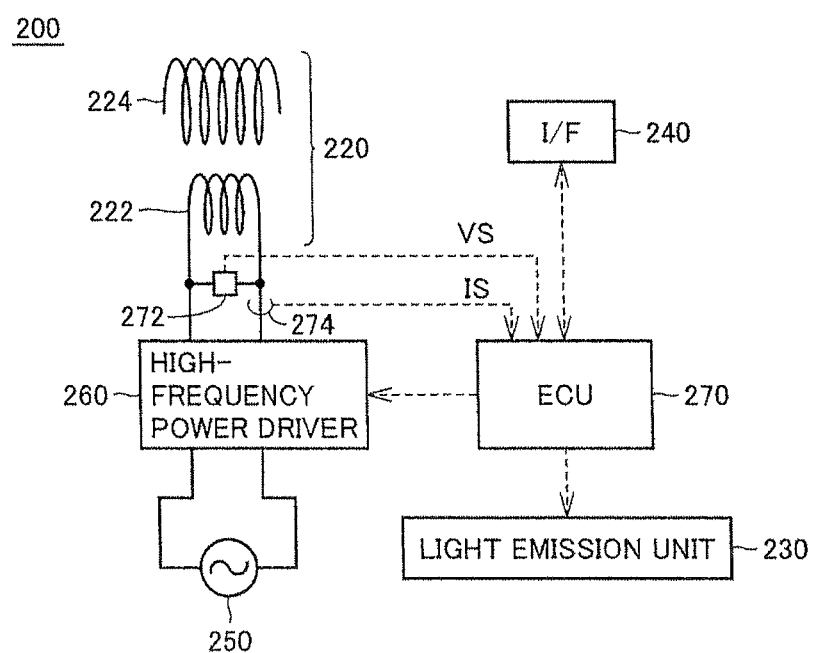
FIG. 10 is a functional block diagram of a power feeding apparatus shown in FIG. 1.

FIG. 10 is a functional block diagram of power feeding apparatus 200 shown in FIG. 1. Referring to FIG. 10, power feeding apparatus 200 includes an AC power supply 250, a high-frequency power driver 260, a primary coil 222, a primary self-resonant coil 224, a voltage sensor 272, a current sensor 274, light emission units 230, communication unit 240, and an ECU 270.

AC power supply 250 is a power supply outside of the vehicle, and a system power supply, for example. High-frequency power driver 260 converts electric power received from AC power supply 250 to high-frequency electric power, and supplies the converted high-frequency electric power to primary coil 222. The high-frequency electric power generated by high-frequency power driver 260 has a frequency from 1 to ten-plus MHz, for example.

Primary coil 222 is provided coaxially with primary self-resonant coil 224, and can be magnetically coupled to primary self-resonant coil 224 by electromagnetic induction. Primary coil 222 feeds the high-frequency electric power supplied from high-frequency power driver 260 to primary self-resonant coil 224 by electromagnetic induction.

As with secondary self-resonant coil 112 of electrically powered vehicle 100, primary self-resonant coil 224 is an LC resonant coil with open (unconnected) opposing ends, and transfers electric power to electrically powered vehicle 100 by resonating with secondary self-resonant coil 112 of electrically powered vehicle 100 through an electromagnetic field. A capacity component of primary self-resonant coil 224 is also a stray capacitance of the coil, however, a capacitor connected across both ends of the coil may be provided. Turns of primary self-resonant coil 224 are also set as appropriate to have a large Q value (e.g., Q>100), a large degree of coupling κ and the like, based on a distance from secondary self-resonant coil 112 of electrically powered vehicle 100, a resonant frequency of primary self-resonant coil 224 and secondary self-resonant coil 112, and the like.

Primary self-resonant coil 224 and primary coil 222 form power transferring unit 220 shown in FIG. 1. Light emission units 230 and communication unit 240 were already described with reference to FIG. 1. Voltage sensor 272 detects a voltage VS output from high-frequency power driver 260, and outputs the detected value to ECU 270. Current sensor 274 detects a current IS output from high-frequency power driver 260, and outputs the detected value to ECU 270.

ECU 270 receives the activation instruction from electrically powered vehicle 100 via communication unit 240, and activates power feeding apparatus 200. ECU 270 receives the lighting instruction for light emission units 230 from electrically powered vehicle 100 via communication unit 240, and lights light emission units 230. ECU 270 receives the electric power feeding instruction from electrically powered vehicle 100 via communication unit 240, and controls an output from high-frequency power driver 260 such that electric power supplied from power feeding apparatus 200 to electrically powered vehicle 100 attains to a target value.

Further, ECU 270 transmits electric power information about power feeding apparatus 200 including the detected values for voltage VS from voltage sensor 272 and current IS from current sensor 274 to electrically powered vehicle 100 via communication unit 240 while receiving the during-guidance-control signal from electrically powered vehicle 100 via communication unit 240. During the reception of the during-guidance-control signal, ECU 270 controls an output from high-frequency power driver 260 to output prescribed electric power smaller than electric power during power feeding in response to the electric power feeding instruction.

Figure 11:
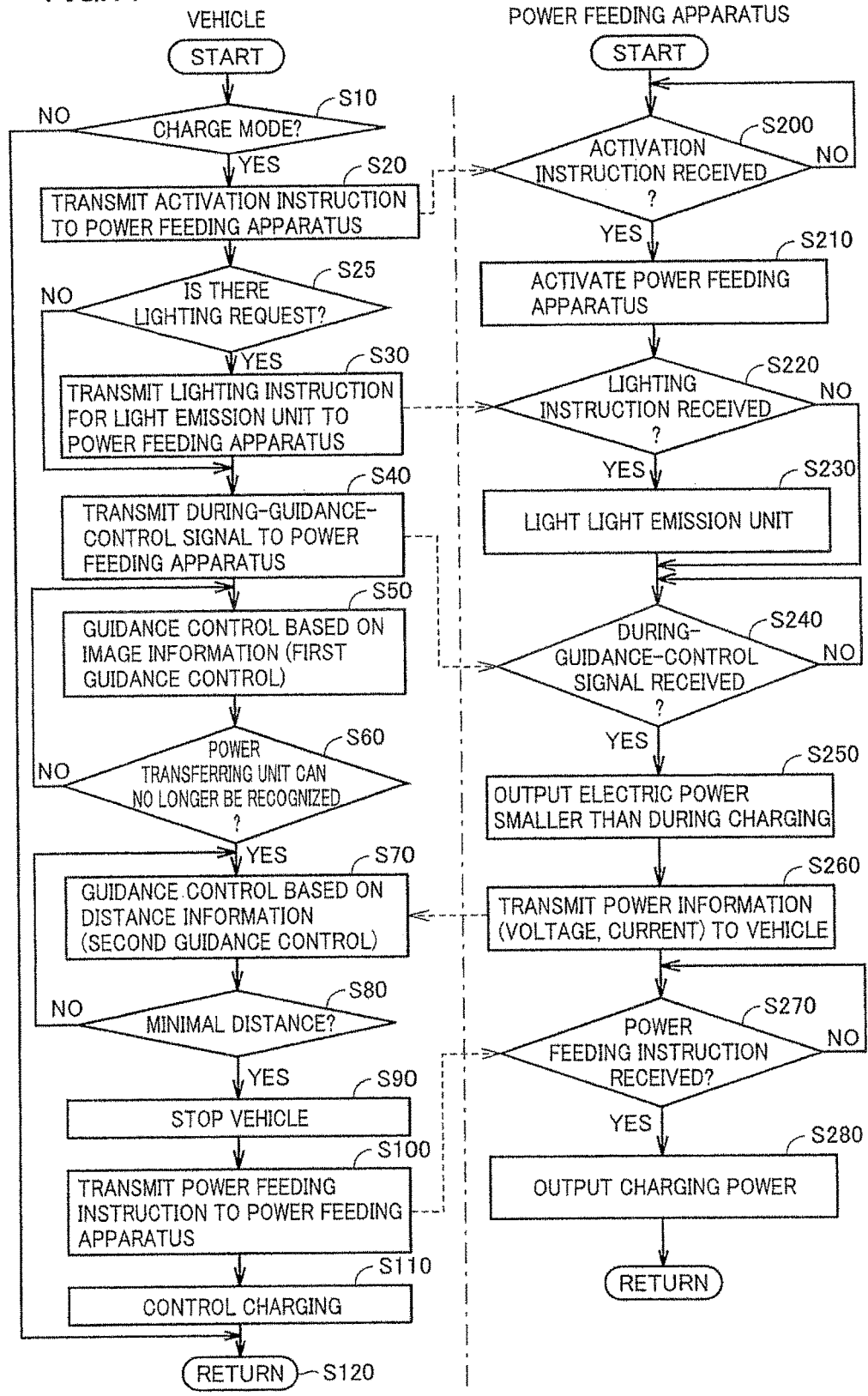
FIG. 11 is a flowchart illustrating guidance control of the vehicle performed by the control device of the electrically powered vehicle and an ECU of the power feeding apparatus.

FIG. 11 is a flowchart illustrating guidance control of the vehicle performed by control device 180 of electrically powered vehicle 100 and ECU 260 of power feeding apparatus 200. The process shown in this flowchart is executed at regular time intervals or when a prescribed condition is satisfied.

Referring to FIG. 11, in electrically powered vehicle 100, control device 180 determines whether or not an operation mode of the vehicle is a charge mode (step S10). During a non-charge mode, i.e., during a travel mode (NO at step S10), control device 180 proceeds to step S120 without executing the rest of the process.

If it is determined at step S10 that the operation mode is a charge mode (YES at step S10), control device 180 establishes communication between communication unit 130 of the vehicle and communication unit 240 of power feeding apparatus 200, and transmits an activation instruction to activate power feeding apparatus 200 to power feeding apparatus 200 via communication unit 130 (step S20). Then, if there is a lighting request for light emission units 230 provided on power transferring unit 220 of power feeding apparatus 200 (YES at step S25), control device 180 transmits a lighting instruction for lighting of light emission units 230 to power feeding apparatus 200 via communication unit 130 (step S30). Then, control device 180 transmits a during-guidance-control signal indicating that guidance control of the vehicle to power transferring unit 220 is being performed to power feeding apparatus 200 via communication unit 130, and continues the transmission until after alignment of power transferring unit 220 with power receiving unit 110 is completed (step S40).

Thereafter, control device 180 performs the guidance control based on image information from camera 120 (first guidance control) with the method described above (step S50). The first guidance control is performed until after electrically powered vehicle 100 approaches power feeding apparatus 200 and power transferring unit 220 comes under the body of the vehicle so that power transferring unit 220 can no longer be recognized based on the image information from camera 120 (step S60).

When power transferring unit 220 can no longer be recognized based on the image information from camera 120 (YES at step S60), control device 180 estimates a distance between power transferring unit 220 and power receiving unit 110 based on the electric power information (output voltage and current from power feeding apparatus 200) transmitted from power feeding apparatus 200 with the method described above. Then, control device 180 performs the guidance control based on the distance information estimated based on an electric power feeding condition from power transferring unit 220 to power receiving unit 110 (second guidance control) (step S70).

During the second guidance control, control device 180 determines whether or not the distance between power transferring unit 220 and power receiving unit 110 became a minimal distance based on a differential value of the distance between power transferring unit 220 and power receiving unit 110 with the method described above (step S80). If it is determined that the distance between power transferring unit 220 and power receiving unit 110 became a minimal distance (YES at step S80), control device 180 causes the vehicle to stop, and activates the electric parking brake (step S90).

Thereafter, control device 180 transmits an electric power feeding instruction for substantial electric power feeding from power feeding apparatus 200 to electrically powered vehicle 100 to power feeding apparatus 200 via communication unit 130 (step S100). Further, control device 180 turns system main relay SMR2 on and drives DC/DC converter 142, and performs charging control of power storage device 150 (step S110).

In power feeding apparatus 200, if communication unit 240 receives the activation instruction transmitted from electrically powered vehicle 100 (YES at step S200), ECU 270 activates power feeding apparatus 200 (step S210). Then, if communication unit 240 receives the lighting instruction transmitted from electrically powered vehicle 100 (YES at step S220), ECU 270 lights light emission units 230 (step S230). Then, if communication unit 240 receives the during-guidance-control signal transmitted from electrically powered vehicle 100 (YES at step S240), ECU 270 controls an output from high-frequency power driver 260 to output predetermined electric power smaller than during charging (step S250).

During reception of the during-guidance-control signal, ECU 270 transmits the detected value for voltage VS from voltage sensor 272 which indicates magnitude of the voltage output from power feeding apparatus 200 and the detected value for current IS from current sensor 274 which indicates magnitude of the current output from power feeding apparatus 200 as electric power information about power feeding apparatus 200 to electrically powered vehicle 100 via communication unit 240 (step S260).

Then, if communication unit 240 receives the electric power feeding instruction transmitted from electrically powered vehicle 100 (YES at step S270), ECU 270 controls an output from high-frequency power driver 260 to output charging power for charging the vehicle (step S280).

As described above, in the present embodiment, parking control of electrically powered vehicle 100 is performed in two stages. In the first stage, positional relation between power transferring unit 220 and power receiving unit 110 is sensed based on image information from camera 120 incorporated in the vehicle, and the vehicle is controlled such that it is guided to power transferring unit 220 based on the sensed result (first guidance control). In the second stage, distance L between power transferring unit 220 and power receiving unit 110 is sensed based on an electric power feeding condition from power transferring unit 220 to power receiving unit 110. Then, when the vehicle approaches power transferring unit 220 so close that power transferring unit 220 comes under the body of the vehicle and camera 120 can no longer take an image of power transferring unit 220, the vehicle is controlled such that power transferring unit 220 is aligned with power receiving unit 110 based on distance information between power transferring unit 220 and power receiving unit 110 sensed based on the electric power feeding condition from power transferring unit 220 to power receiving unit 110 (second guidance control). As such, alignment of power transferring unit 220 of power feeding apparatus 200 with power receiving unit 110 incorporated in the vehicle can be performed without providing large-size equipment. Therefore, according to the present embodiment, power feeding system for vehicle 10 can be realized with a simple structure while parking accuracy to power feeding apparatus 200 is ensured.

In the embodiment described above, the guidance control based on image information (first guidance control) is performed when the distance between power feeding apparatus 200 and electrically powered vehicle 100 is large, and the guidance control based on distance information which requires electric power transfer from power transferring unit 220 (second guidance control) is performed after the distance between power feeding apparatus 200 and electrically powered vehicle 100 becomes smaller. Further, electric power output from power transferring unit 220 during the second guidance control is smaller than electric power output after charging control is started. Therefore, according to the present embodiment, electric power consumption can be suppressed.

In the embodiment described above, power feeding apparatus 200 is activated in response to the instruction from electrically powered vehicle 100 which receives electric power from power feeding apparatus 200, and light emission units 230 are lighted in response to the instruction from electrically powered vehicle 100. Therefore, according to the present embodiment, unnecessary electric power consumption can be suppressed while the vehicle is not charged.

Although switching from the first guidance control based on image information from camera 120 to the second guidance control based on distance information is done when power transferring unit 220 enters a blind spot of camera 120 in the embodiment described above, switching from the first guidance control to the second guidance control may be done when the vehicle comes within a predetermined distance from power transferring unit 220. For example, a distance that allows power receiving unit 110 to receive electric power from power transferring unit 220 can be set as the predetermined distance.

Although the electric power information about power feeding apparatus 200 is transmitted to electrically powered vehicle 100 and the distance information is generated on the vehicle side based on the electric power information in the above description, the distance information may be generated on the side of power feeding apparatus 200 and transmitted to electrically powered vehicle 100 based on an output current in power feeding apparatus 200 or by transmitting a receiving voltage at the vehicle from electrically powered vehicle 100 to power feeding apparatus 200. Alternatively, power feeding apparatus 200 may have the distance information, and determine whether or not the second guidance control based on the distance information has been completed.

Although an accelerator and a brake are operated by a driver during the first guidance control and automatically operated during the second guidance control in the above description, the accelerator and the brake may be automatically operated during the first guidance control as well, or may be operated by the driver during the second guidance control as well.

Although camera 120 is provided at the rear of the vehicle in the above description, a place where camera 120 is provided is not limited to the rear of the vehicle.

Although electric power is transferred from power feeding apparatus 200 to electrically powered vehicle 100 in a non-contact manner by resonance in the above description, a power transfer method from power feeding apparatus 200 to electrically powered vehicle 100 is not necessarily limited to resonance. Other non-contact power transfer methods such as power transfer using electromagnetic induction and power transfer using a microwave may be employed. Again with these power transfer methods, a distance between the power transferring unit and the power receiving unit can be estimated based on an electric power feeding condition from the power feeding apparatus to the vehicle.

Although the position and the orientation of power transferring unit 220 are recognized by image recognition based on light emission units 230 in the above description, a shape and the like of power transferring unit 220 may be recognized by image recognition without providing light emission units 230. By providing light emission units 230 as in the embodiment described above, the position and the orientation of power transferring unit 220 can be recognized even during the night.

Although electric power is transferred by resonance of the pair of self-resonant coils in the above description, a high dielectric disk made of a high dielectric constant material may be used instead of the self-resonant coils as a resonator.

Although a series/parallel hybrid car capable of splitting mechanical power of engine 176 by power split device 177 to transmit the resultant power to drive wheel 178 and motor generator 172 is described as the electrically powered vehicle in the above description, the present invention is also applicable to hybrid cars of other types. That is, the present invention is also applicable, for example, to a so-called series hybrid car which uses engine 176 only for driving motor generator 172 and generates a driving force of the car only by motor generator 174, a hybrid car in which only regenerative energy out of kinetic energy generated by engine 176 is recovered as electric energy, a motor-assisted hybrid car in which an engine is used for main mechanical power and a motor assists the engine as necessary, and the like.

The present invention is also applicable to an electric vehicle not including engine 176 but traveling only with electric power, and a fuel cell car including a fuel cell in addition to power storage device 150 as a DC power supply. The present invention is also applicable to an electrically powered vehicle not including boost converter 162, and an electrically powered vehicle not including DC/DC converter 142.

In the above description, camera 120 and IPA-ECU 410 form "first sensing means" (first sensing unit) in the present invention, and IPA-ECU 410 and EPS 420 form "first guidance control means" (first guidance control unit) in the present invention. Resonant ECU 460 corresponds to "second sensing means" (second sensing unit) in the present invention, and HV-ECU 470, MG-ECU 430 and ECB 440 form "second guidance control means" (second guidance control unit) in the present invention.

In addition, camera 120 corresponds to an "image taking device" in the present invention, and IPA-ECU 410 corresponds to an "image recognition unit" in the present invention. Communication units 130, 240 form "communication means" in the present invention, and primary self-resonant coil 224 corresponds to a "power transferring coil" in the present invention. Secondary self-resonant coil 112 corresponds to a "power receiving coil" in the present invention, and resonant ECU 460 corresponds to a "distance estimation unit" in the present invention. EPS 420 corresponds to a "first control unit" in the present invention, and MG-ECU 430 and ECB 440 form a "second control unit" in the present invention. High-frequency power driver 260 and ECU 270 form a "power control unit" in the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

The invention claimed is:

1. A power feeding system comprising:
    a power feeding apparatus including a power transferring unit and a first communication unit; and
    a vehicle including a power receiving device that receives electric power from the power transferring unit, and a second communication unit; wherein
        the vehicle transmits a request signal to the power feeding apparatus;
        the power transferring unit starts transmitting electric power after the power feeding apparatus receives the request signal from the vehicle; and
        the vehicle measures a voltage profile of a receiving electric power from the power transferring unit and checks accomplished level at fine positioning between the vehicle and the power transferring unit.

2. The power feeding system according to claim 1, wherein the vehicle transmits the request signal after communication with the power feeding apparatus is established.

3. The power feeding system according to claim 1, wherein the power feeding apparatus transmits information about a power transmission voltage and a power transmission current after communication with the vehicle is established.

4. The power feeding system according to claim 1, wherein the vehicle completes adjustment of a position of the power receiving device to a position of the power transferring unit when a change ratio of at least one of a received current and received voltage received from the power transferring unit becomes smaller than a predetermined value.

5. The power feeding system according to claim 1, wherein electric power supplied from the power transferring unit to the power receiving device during adjustment of a position of the power receiving device to a position of the power transferring unit is smaller than electric power supplied from the power transferring unit to the power receiving device after completion of the adjustment of the position of the power receiving device to the position of the power transferring unit.

6. An electrically powered vehicle including a power receiving device that receives electric power from a power transferring unit, the electrically powered vehicle comprising:
    a sensing unit configured to measure a voltage profile and to sense a distance between the power transferring unit and the power receiving device based on the measured voltage profile of a received electric power from the power transferring unit; and
    a guidance control unit configured to control the vehicle to adjust a position of the power receiving unit to a position of the power transferring unit based on a sensed distance by the sensing unit.

7. The electrically powered vehicle according to claim 6, wherein
    electric power supplied from the power transferring unit to the power receiving unit during adjustment of the position of the power receiving unit to the position of the power transferring unit by the guidance control unit is smaller than electric power supplied from the power transferring unit to the power receiving unit after completion of the adjustment.

* * * * *